(12) United States Patent
Miyajima

(10) Patent No.: US 7,250,986 B2
(45) Date of Patent: Jul. 31, 2007

(54) EXTERNAL OUTPUT VIDEO SIGNAL PROCESSOR

(75) Inventor: Keiko Miyajima, Kamifukuoka (JP)

(73) Assignee: New Japan Radio Co., Ltd., Tokyo-to (JP)

( * ) Notice: Subject to any disclaimer, the term of this patent is extended or adjusted under 35 U.S.C. 154(b) by 335 days.

(21) Appl. No.: 10/820,362

(22) Filed: Apr. 7, 2004

(65) Prior Publication Data
US 2004/0196409 A1    Oct. 7, 2004

(30) Foreign Application Priority Data
Apr. 7, 2003    (JP) ............................... 2003-102590

(51) Int. Cl.
    *H04N 5/16*    (2006.01)
(52) U.S. Cl. .................................... 348/691
(58) Field of Classification Search ............... 348/689, 348/691–697
See application file for complete search history.

(56) References Cited

U.S. PATENT DOCUMENTS

| | | | |
|---|---|---|---|
| 5,379,075 A * | 1/1995 | Nagasawa et al. | 348/678 |
| 5,570,090 A * | 10/1996 | Cummins | 341/144 |
| 5,798,802 A * | 8/1998 | Elmis et al. | 348/689 |
| 5,892,555 A * | 4/1999 | Sohn | 348/689 |
| 5,995,166 A * | 11/1999 | Kawano | 348/691 |
| 6,195,133 B1 * | 2/2001 | Bae | 348/678 |
| 6,633,340 B1 * | 10/2003 | Ohara et al. | 348/536 |
| 7,023,497 B2 * | 4/2006 | Fang et al. | 348/694 |

FOREIGN PATENT DOCUMENTS

JP    H07-46443    2/1995

OTHER PUBLICATIONS

Patent Abstracts of Japan, Publication No. 07-046443, "SYNC Tip Clamping/Synchronization Separating Circuit,", Shoei et al., Sony Corp.

* cited by examiner

*Primary Examiner*—Brian P. Yenke
(74) *Attorney, Agent, or Firm*—Ware, Fressola, Van Der Sluys & Adolphson LLP

(57) ABSTRACT

The object of the invention is offering an external output video signal processor, which does not need coupling capacitor or clamping circuit. A system controller outputs a video signal by which the sync. tip level and the pedestal level were fixed to a predetermined value. It was considered as an external output video signal processor which carries out direct input of the video signal output to the video signal processing circuit from the system controller, and is characterized by providing a level shift circuit which adjusts the level and is sent to said latter part processing circuit.

2 Claims, 2 Drawing Sheets

EXTERNAL OUTPUT VIDEO SIGNAL PROCESSOR

BACKGROUND OF THE INVENTION

This invention relates to an external output video signal processor for carrying out external output of the video signal with a predetermined p-p value. The fundamental configuration of an external output video signal processor currently used conventionally is shown in FIG. 3. The DC component of a video signal output from system controller 10 is cut with coupling capacitor 30. The video signal is taken into clamping circuit 23 (for example, see Japanese Unexamined Patent Publication No. 46443/1995) of video signal processing circuit 20a which consists of a microchip and it's continuous current is regenerated. It is sent to latter part processing circuit 22, and is amplified (p-p value) in the part. After being adjusted, it is output outside. Since the video signal which is output from latter part processing circuit 22 is determined to set to 1.0 Vpp when it is terminated by 75-ohm resistance, the output swing (p-p value) usually serves as 2.0 Vpp.

FIG. 4 is a figure showing the configuration of an external output video signal processor in which system controller 10a of FIG. 3 is shown in more detail. The video signal output by DSP 11 of system controller 10a in current is converted into voltage by resistance 12, matched with impedance by impedance conversion circuit 13, and input into coupling capacitor 30.

If video signal is made to input into latter part processing circuit 22 of video signal processing circuit 20a as it is when the reference level of video signal output from system controller 10a is not being fixed, or when sync. tip is not the optimal level, crushing occurs in the top or the bottom of the signal wave form, which are output from the latter part processing circuit 22, and when the video signal is reproduced, deterioration of image quality will be caused.

Then, in order to prevent distortion of the signal wave form output from this latter part processing circuit 22, coupling capacitor 30 and clamping circuit 23 are formed as mentioned above. With coupling capacitor 30, DC component of output is cut and only the Alternating Current component is extracted. Continuous current regeneration of this is input and carried out to clamping circuit 23. By doing in this way, sync. tip level and pedestal level are fixed to predetermined level, and the indispensable dynamic range is retained.

SUMMARY OF THE INVENTION

As mentioned above, the conventional external output video signal processor has necessarily equipped coupling capacitor 30 and clamping circuit 23. Even if sync. tip level and pedestal level of video signal output from system controller 10a are in a normal level, it has also coupling capacitor and clamping circuit.

However, when coupling capacitor 30 is used as mentioned above, a high pass filter is constituted by this coupling capacitor 30 and the input impedance of clamping circuit 23. Therefore, when the capacity of coupling capacitor 30 is reduced, there is the problem that shrinkage of synchronizing signal and sag (inclination of top part) will occur. The capacity of coupling capacitor 30 cannot be small for these reasons. Therefore, coupling capacitor 30 could not be built in video signal processing circuit 20a which is a microchip, but there was the problem of an external output video signal processor that the number of components increased constitutionally.

The object of the invention is offering an external output video signal processor which does not need a coupling capacitor or a clamping circuit, when the sync. tip level and the pedestal level of the video signal which are output from the system controller are in a predetermined level.

In an external output video signal processor which consists of a system controller which outputs a video signal to a video signal processing circuit, and the video signal processing circuit which has a latter part processing circuit, which outputs a video signal of which the p-p value is controlled to a predetermined level, said system controller outputs a video signal by which the sync. tip level and the pedestal level are fixed to a predetermined value. It is considered as an external output video signal processor which carries out direct input of said video signal output to said video signal processing circuit from said system controller, and is characterized by providing a level shift circuit which adjusts the level and is sent to said latter part processing circuit.

Said level shift circuit is constituted by two steps of inversion amplifiers in an external output video signal processor.

DETAILED DESCRIPTION

Figure 1:
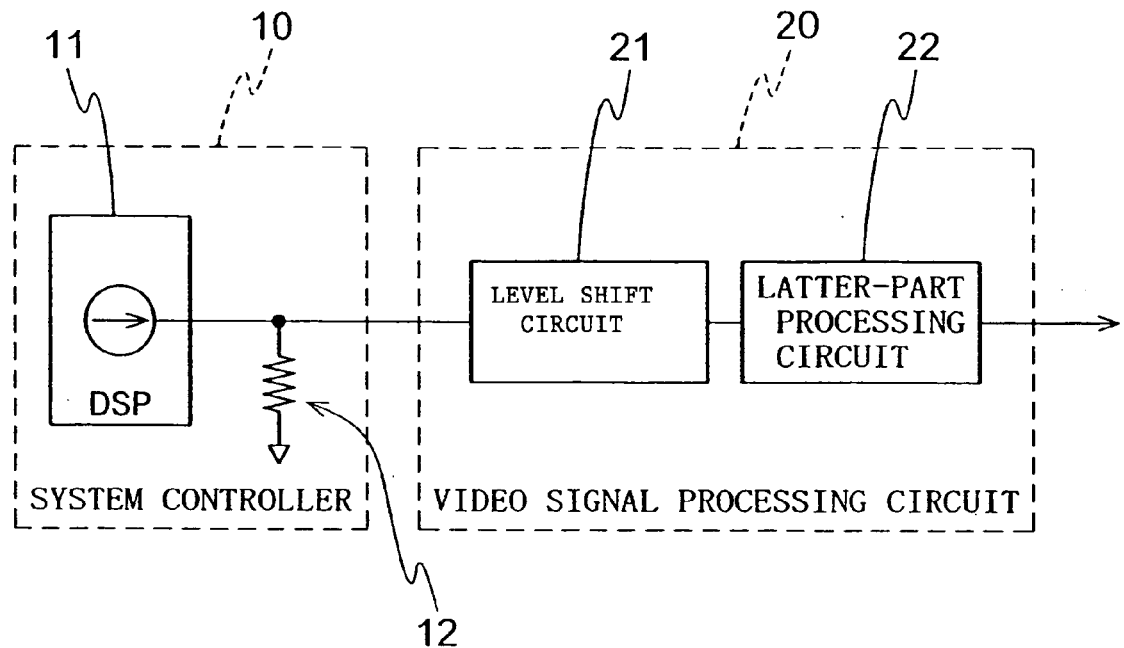
FIG. 1 is a block diagram of an external output video signal processor of one embodiment of the invention.

FIG. 1 is a block diagram showing the configuration of an external output video signal processor of one embodiment of the invention. System controller 10 provides DSP11 which outputs a video signal with a current signal, and resistance 12 which transforms the current signal into a voltage signal. Video signal processing circuit 20, which consists of a microchip, carries out direct input of the signal level output from system controller 10, and provides level shift circuit 21 shifted to a certain level, and latter part processing circuit 22 to which amplitude (p-p value) outputs a video signal of 2.0 Vpp(s).

At this stage, the video signal, as for, the current output carried out by DSP11 is set to a level predetermined in the sync. tip level or the pedestal level when changed into a voltage signal by resistance 12. That is, as for a video signal of current from DSP11, the sync. tip level and the pedestal level are already being fixed to a predetermined value. Therefore, such a video signal can be directly input to level shift circuit 21 of video signal processing circuit 20, without performing DC component cut and continuous current regeneration. However, in the case the video signal is input into latter part processing circuit 22 as it is, a video signal of an amplitude of 2.0 Vpp(s) cannot be output from the part.

Then, it enables it to output a video signal of an amplitude of 2.0 Vpp(s) from there by inserting level shift circuit 21, and inputting into latter part processing circuit 22, after adjusting the level of the video signal output from system controller 10.

Figure 2:
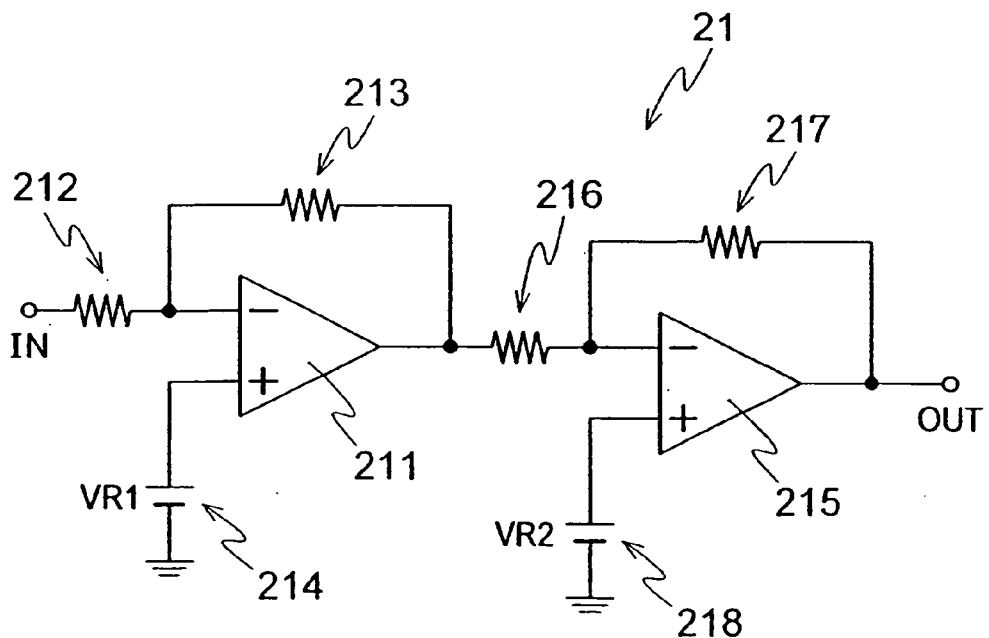
FIG. 2 is a circuit diagram of a level shift circuit of the external output video signal processor of FIG. 1.
Figure 3:
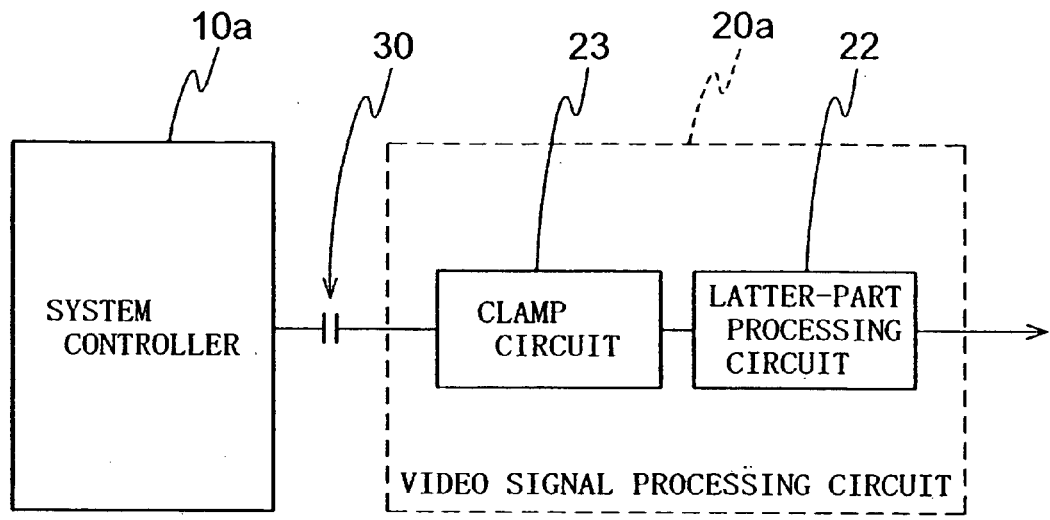
FIG. 3 is a block diagram of an external output video signal processor of the conventional embodiment.
Figure 4:
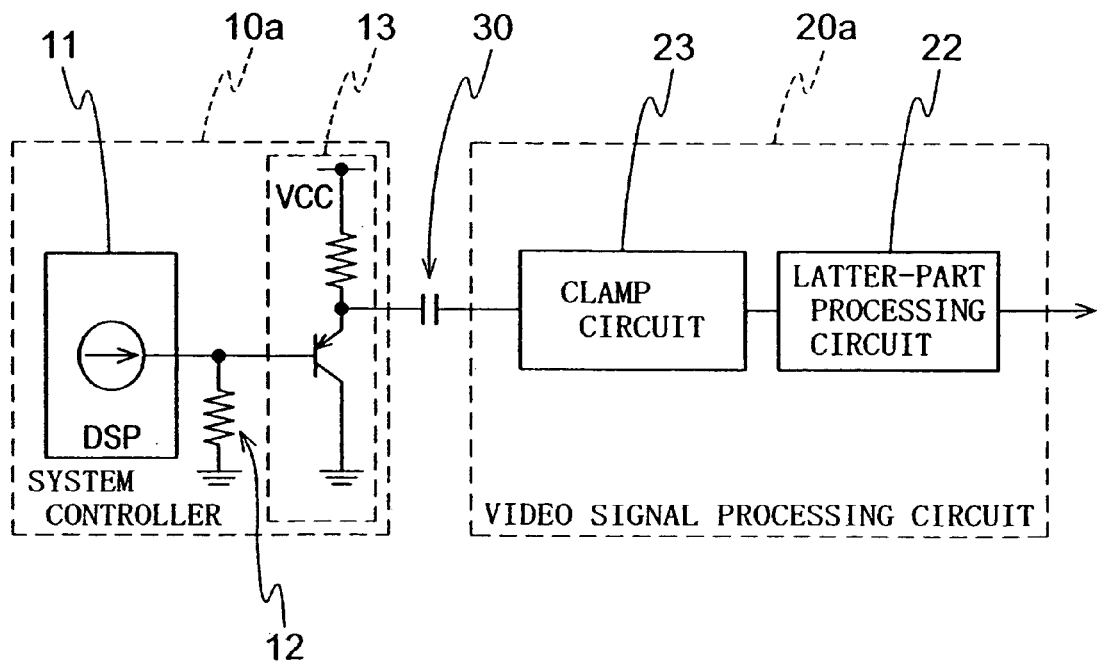
FIG. 4 is a more detailed block diagram of the external output video signal processor of FIG. 3.

FIG. 2 is a circuit diagram showing the concrete configuration of level shift circuit 21. This level shift circuit 21 comprises two stages of inverting amplifiers.

The first stage of the inverting amplifier comprises inverting amplifier 211, input resistor 212, feedback resister 213, and source 214 of reference voltage of voltage VR1. The latter stage of the inverting amplifier comprises inverting amplifier 215, input resistor 216, feedback resister 217, and reference voltage source 218 of voltage VR2.

By amplifying the video signal to which the sync. tip level and the pedestal level were fixed in level shift circuit 21 which comprises two stages of inverting amplifiers in this way, the video signal of a predetermined level is generated, it is input into latter part processing circuit 22, and the video signal of an amplitude of 2.0 Vpp(s) is output from there.

Thus, even if it deletes conventionally needed coupling capacitor and clamping circuit, the sync. tip level and the pedestal level are fixed on a predetermined level as usual, and a video signal of a predetermined amplitude value (p-p value) can be made to output from latter part processing circuit 22 in the external output video signal processor of this embodiment.

According to the present invention, as explained above, since a coupling capacitor becomes unnecessary, the number of components can be reduced and, thereby, cost cut and space-saving can be attained. Shrinkage of the synchronizing signal and generating of sag resulting from a coupling capacitor can also be prevented.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. An external output video signal processor, comprising: a system controller, comprising a DSP unit for outputting a video signal in form of a current signal, and a resistance for transforming said current signal into a voltage signal for output, wherein said system controller is configured to output the voltage signal in which a sync tip level and a pedestal level of the voltage signal are fixed to a predetermined value; and a video signal processing circuit coupled to said system controller, said video signal processing circuit comprises a level shift circuit and a latter-part processing circuit, wherein said level shift circuit is configured to receive said voltage signal directly from said system controller and output a shifted signal adjusted to a certain level, and said latter-part processing circuit is configured to receive said shifted signal from said level shift circuit and output a signal in which a p-p value of the signal is controlled to a predetermined value.

2. An external output video signal processor according to claim 1, wherein said level shift circuit comprises two stages of an inverting amplifier.

* * * * *